United States Patent [19]
Lacy

[11] Patent Number: 5,577,737
[45] Date of Patent: Nov. 26, 1996

[54] METHOD AND APPARATUS FOR ESTABLISHING AND MAINTAINING A FLUID SEAL AROUND A POLISHING ROD

[75] Inventor: C. Dean Lacy, College Station, Tex.

[73] Assignee: Universal Stuffing Box, Inc., College Station, Tex.

[21] Appl. No.: 608,953

[22] Filed: Feb. 29, 1996

Related U.S. Application Data

[63] Continuation of Ser. No. 116,061, Sep. 2, 1993, abandoned.

[51] Int. Cl.⁶ .......................................................... F16J 9/00
[52] U.S. Cl. .................................. 277/1; 277/110; 277/124
[58] Field of Search ........................................ 277/1, 44, 47, 277/50, 102, 110, 123, 124

[56] References Cited

U.S. PATENT DOCUMENTS

| | | | |
|---|---|---|---|
| 2,029,463 | 2/1936 | Clark | 277/123 |
| 2,833,572 | 5/1958 | Moseley | 286/16.3 |
| 3,168,320 | 2/1965 | Sneed | 277/110 |
| 3,284,089 | 11/1966 | Wrenshall | 277/125 |
| 3,468,374 | 9/1969 | Reeves | 166/84 |
| 3,801,112 | 4/1974 | Dumazet | 277/124 |
| 4,082,300 | 4/1978 | Harbeck et al. | 277/123 |
| 4,234,197 | 11/1980 | Amancharla | 277/125 |
| 4,327,923 | 5/1982 | Chesterton et al. | 277/124 |
| 4,345,766 | 8/1982 | Turanyi | 277/30 |
| 4,364,542 | 12/1982 | Meyer | 251/214 |
| 4,406,469 | 9/1983 | Allisen | 277/123 |
| 4,433,847 | 2/1984 | Weinberg | 277/125 |
| 4,440,404 | 4/1984 | Roach et al. | 277/124 |
| 4,451,047 | 5/1984 | Herd et al. | 277/26 |
| 4,560,176 | 12/1985 | Hoff | 277/105 |
| 4,576,385 | 3/1986 | Ungchusri et al. | 277/124 |
| 4,613,159 | 9/1986 | Harris et al. | 285/3 |
| 4,635,945 | 11/1987 | Beck | 277/125 |
| 4,844,479 | 7/1989 | Ueda et al. | 277/4 |
| 4,875,690 | 10/1989 | Tojo | 277/12 |
| 4,878,815 | 11/1989 | Stachowiak | 417/63 |
| 4,907,812 | 3/1990 | Meyer | 277/117 |
| 4,991,857 | 2/1991 | Pippert | 277/102 |
| 5,056,758 | 10/1991 | Bramblet | 251/214 |
| 5,137,083 | 8/1992 | Bump | 166/84 |
| 5,201,532 | 4/1993 | Salesky et al. | 277/124 |
| 5,217,068 | 6/1993 | Newton | 166/84 |
| 5,257,812 | 11/1995 | Osorio et al. | 666/84 |

*Primary Examiner*—Daniel G. DePumpo
*Attorney, Agent, or Firm*—Fish & Richardson P.C.

[57] ABSTRACT

The invention is a sealing apparatus and method of providing a seal for polished rods in oil and gas well applications. The sealing apparatus has a fluid responsive gland which forms a seal between the inner surface of a unitized housing body and a polished rod to effect a seal of fluids within a well. The fluid responsive gland comprises packing rings of supple and rigid materials, in alternating configurations to achieve a seal. The sealing apparatus is self-aligning, and the packing rings reside in a continuous and uninterrupted zone. The packing rings may be replaced without removing the sealing apparatus from the polished rod. The sealing apparatus may be aligned without external alignment apparatus or adjustment.

14 Claims, 4 Drawing Sheets

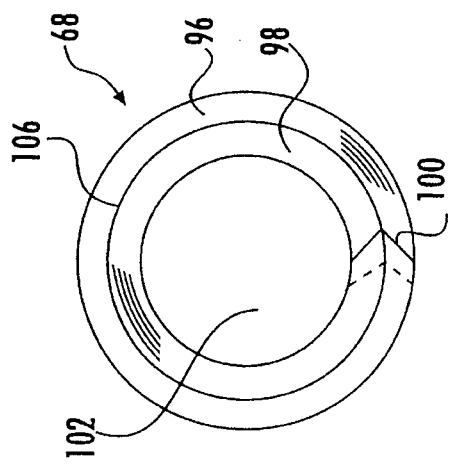
FIG. 5
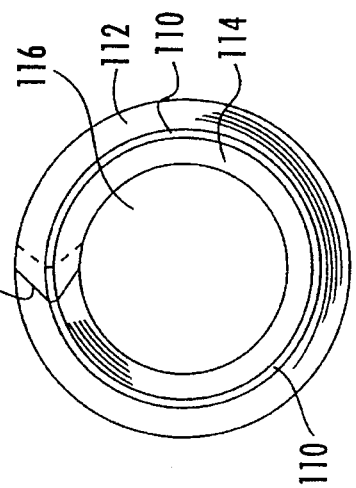
FIG. 6
FIG. 7
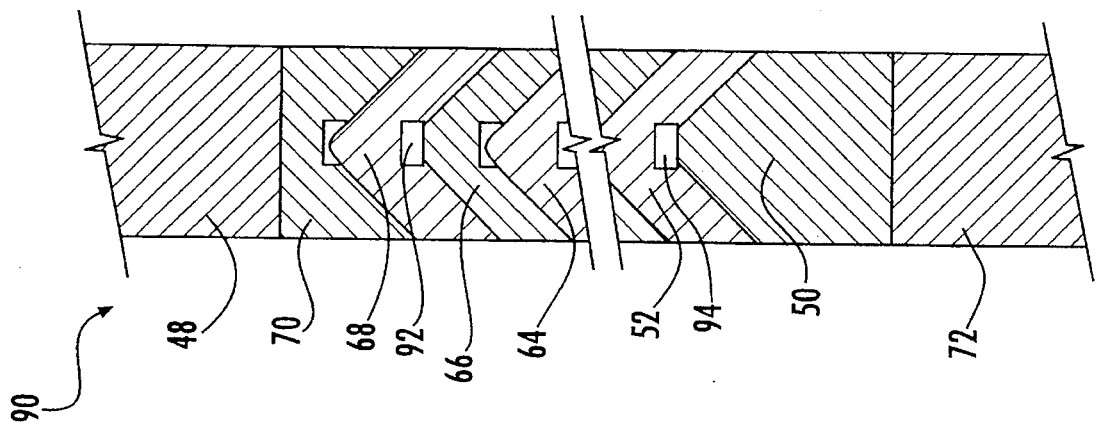
FIG. 4

METHOD AND APPARATUS FOR ESTABLISHING AND MAINTAINING A FLUID SEAL AROUND A POLISHING ROD

This application is a file wrapper continuation of U.S. application Ser. No. 08/116,061, filed Sep. 2, 1993, now abandoned.

BACKGROUND OF THE INVENTION

This invention is an improved method and apparatus for establishing and maintaining a fluid seal on a well.

Reliability, safety, and ease of maintenance are among the most important considerations in the design of a fluid seal for a pumping valve on a well head. Fluid sealing apparatus, sometimes known as "stuffing boxes", seal a well by providing a packing material in close association with a polished rod. The sealing apparatus typically contains packing material that forms a fluid resistant barrier at the interface of the packing material and polished rod. The polished rod reciprocates in and out of the sealing apparatus. A stuffing box contains "stuffing" or packing, which prevents the leakage of hydrocarbons or other fluids during operation of a well.

There are several types of stuffing boxes. Some stuffing boxes use opposing rams which close upon the surface of the polished rod from two or more directions, thereby encircling the polished rod and forming a seal. Other types of stuffing boxes contain cone-shaped packing material that is stacked within the housing of the stuffing box. The packing in "cone-type" stuffing boxes comprises a stack of funnel-shaped packing discs that are forced into close association with the polished rod by mechanical devices such as bolts, adjustment screws, and the like.

In both ram-type and cone-type stuffing boxes, the packing material typically is forced into engagement with the polished rod by manually engaging alignment apparatus. In some cases, hydraulic pressures are used to force the packing material into close association with the polished rod, thereby sealing the well.

Many stuffing boxes contain relatively complex bolting arrangements, which may include alignment bolts or other mechanical devices on the exterior of the stuffing box. Stuffing boxes are easily damaged, because they are located in the relatively harsh environment above a wellhead. Oil field workers use heavy tools and machinery in the immediate vicinity of stuffing boxes. Work on wells may be performed at night or during conditions of low visibility, making it difficult to avoid damaging stuffing boxes. Parts extending from the surface of stuffing boxes easily can be damaged. If a stuffing box is damaged, the seal may be broken, allowing oil or other corrosive fluids to escape from the well, causing environmental and safety hazards.

Maintenance of stuffing boxes is expensive. It is costly to dispatch personnel to a well site to replace and/or maintain the sealing arrangement of a stuffing box. Further, when a stuffing box must be replaced or maintained, production from the well must be temporarily discontinued, reducing profits from the well.

Conventional methods of replacing packing materials inside stuffing boxes include disassembly of the stuffing box by unbolting, unlatching or otherwise releasing mechanical or hydraulic fasteners. Upon such disassembly, the packing materials are replaced with new materials, and the stuffing box is reassembled. The time required and frequency of replacement of packing materials is an important factor in the quality of the results achieved with a particular stuffing box. A stuffing box that facilitates easier maintenance is desirable.

In some cases, a stuffing box may be misaligned with the polished rod extending into the stuffing box. Misalignment can result in excess friction of the polished rod with the stuffing box, causing undesirable heat. This friction may provide a safety hazard and increased risk of fire or failure of the stuffing box. Further, such friction may deform a polished rod, requiring its replacement. In some cases, misalignment of a stuffing box reduces the pressure exerted in withdrawing fluids from the well, decreasing production. Misalignment causes premature deterioration of packing materials. Stuffing boxes that require adjustment of alignment bolts or other alignment devices may become misaligned during operation due to failure, weakening, or loosening of such alignment mechanisms.

SUMMARY OF THE INVENTION

This invention provides greatly improved fluid sealing of a well by overcoming previous limitations or shortcomings as to sealing materials and alignment. Further, this invention provides easier maintenance of such a sealing apparatus by improving the performance of the packing material and reducing the time required to disassemble the stuffing box and replace worn packing. A safer and more economical sealing of a well may be achieved using this invention.

The invention provides a method of effecting a fluid seal of a well by providing a unitized sealing apparatus which uses a multi-stage fluid responsive gland within a housing body. The apparatus is self-aligning, and excessive friction resulting from metal-to-metal contact is substantially avoided by self-alignment of the polished rod with the housing body of the invention. Maintenance of the fluid responsive gland is facilitated by the use of a continuous and uninterrupted layer of circular sealing rings which maintain a pressurized sliding seal between the polished rod and well fluids.

In one aspect of the invention, the pressurized sliding seal is maintained by replacing worn portions of the fluid responsive gland while the stuffing box remains connected to the polished rod. The stuffing box may be disassembled to facilitate replacement of packing rings without removing the body of the stuffing box from the polished rod.

In one embodiment, a self-aligning unitized sealing apparatus is provided wherein the unitized housing body comprises a one-piece unit.

The invention is self-aligning, and in one aspect of the invention, the packing materials comprise both rigid and supple rings to effect increased temperature and pressure resistance, resulting in minimal maintenance.

BRIEF DESCRIPTION OF THE DRAWINGS

FIG. 4 is a sectional view of the fluid responsive gland shown in FIG. 3.

FIG. 5 is a top view of a supple packing ring.

FIG. 6 is a side view of the supple packing ring shown in FIG. 5.

FIG. 7 is a top view of a rigid packing ring.

DESCRIPTION OF THE PREFERRED EMBODIMENTS

Figure 1:
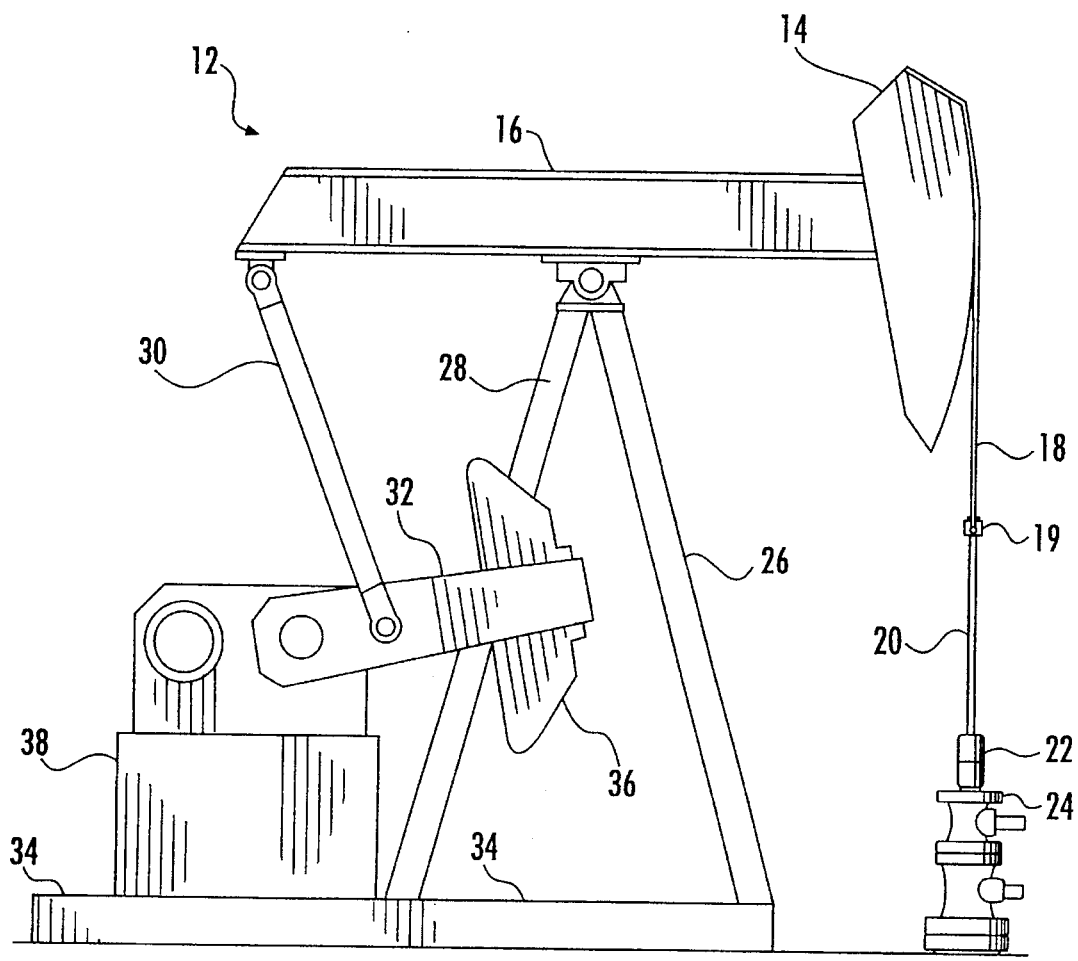
FIG. 1 is perspective view of a pump jack showing the sealing apparatus mounted on the polished rod.

Referring to FIG. 1, the pump jack 12 is shown in a typical oil well configuration. A horse head 14 is connected to a cable 18, and is supported by horizontal beam 16. Reciprocating motion is supplied to horizontal beam 16 by arm 30, which is connected to brace 32. Brace 32 receives rotary motion from drive unit 38. A counterweight 36 is provided at the distal end of brace 32. Left support 28 and right support 26 are connected to base structure 34. The supports and the base structure provide stability to the pump jack. The horse head moves up and down vertically, pulling cable 18, which is connected to polished rod 20 by joint 19.

Polished rod 20 is slidably engaged to sealing apparatus 22. Sealing apparatus 22 is connected to pumping T-valve 24.

Figure 2:
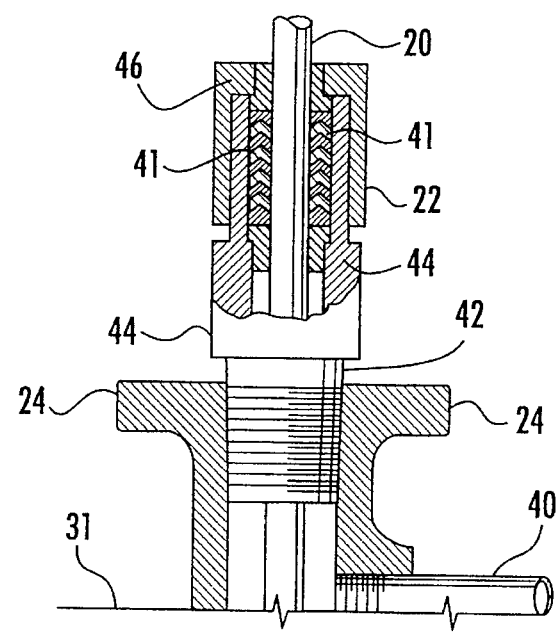
FIG. 2 is a cross-section of the sealing apparatus showing its threaded engagement with a pumping T-valve.

FIG. 2 shows a cross-sectional view of the sealing apparatus 22 and pumping T-valve 24. The sealing apparatus and pumping T-valve are connected by threaded engagement 42. A well output line 40 carries fluid from the well after it is pumped to the ground surface 31. Fluid responsive gland 41 is seen in cross-section in FIG. 2 forming an annular sealing around the circumference of polished rod 20. Cap 46 is connected to the unitized housing body by a threaded engagement not shown in FIG. 2.

Figure 3:
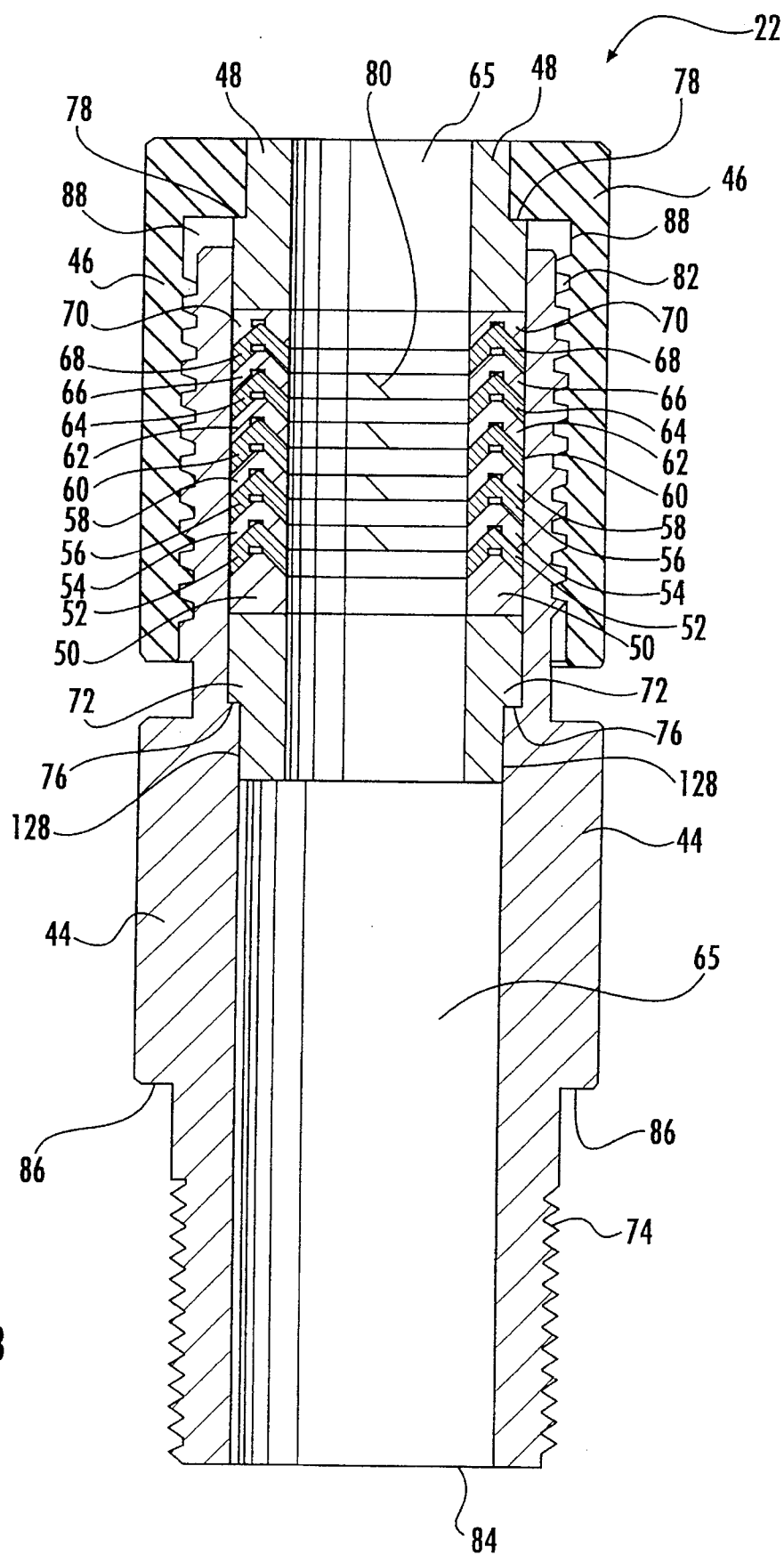
FIG. 3 is a cross-section of the unitized housing body of the sealing apparatus.

FIG. 3 shows a detailed cross-section of the sealing apparatus 22. The polished rod is prevented from engaging unitized housing body 44 by upper self-alignment bushing 48. This bushing provides a mating surface between the polished rod and the inner surface of cap 46 at upper offset mating surface 78. Self-alignment of the sealing apparatus is facilitated by the mating action of the upper self-alignment bushing 48. Metal-to-metal contact may be avoided between the polished rod and cap by the action of upper self-alignment bushing. Upper offset mating surface 78 is the surface engaging the cap 46 when the cap is threaded upon the unitized housing body 44.

Turning to the remainder of the fluid responsive gland 41, a number of packing rings may be seen in a vertical configuration along the length of the sealing apparatus. Recess thread channel 88 may be seen lateral to upper self-aligning bushing 48. A lower self-alignment bushing 72 is seen at the lower portion of the fluid responsive gland. It provides engagement with the polished rod which is not shown in FIG. 3. This bushing facilitates self-alignment of the sealing apparatus with the polished rod. Lower self-alignment bushing 72 cams against lower offset mating surface 76 of the inner surface 128 of the unitized housing body 44. Lower flat packing ring 50 rests upon the upper surface of the lower self-alignment bushing, and it provides the base from which the remainder of the packing rings are stacked in a continuous and uninterrupted zone.

Several different types of sealing arrangements can be used in this invention. For example, different types of packing may be used as the fluid responsive gland. In the preferred embodiment, however, a plurality of rings are alternated in a stacked arrangement. It is preferred that two types of rings be used—supple and rigid. The rigid rings of greater durability preferably are alternated with supple rings having greater sealing ability. For example, in FIG. 3, the packing rings are of two types—supple and rigid.

First supple ring 52 rests upon the upper surface of lower flat packing ring 50. First rigid ring 54 rests upon first supple ring 52. Likewise, the supple and rigid rings are alternated. Second supple ring 56 rests upon the upper surface of first rigid ring 54, and second rigid ring 58 rests upon the upper surface of second supple ring 56. Third supple ring 60 rests upon the upper surface of second rigid ring 58. Third rigid ring 62 rests upon the upper surface of the third supple ring 60. Consequently, fourth supple ring 64 rests upon the upper surface of third rigid ring 62, and fourth rigid ring 66 rests upon the upper surface of fourth supple ring 64. Fifth supple ring 68 rests upon the upper surface of fourth rigid ring 66. Upper flat packing ring 70 rests upon the upper surface of fifth supple ring 68.

Each of the packing rings forms a sealing engagement between the inner surface of the unitized housing body 65 and the outer surface of polished rod 20 (not shown in FIG. 3).

In the preferred embodiment, packing rings are located circumferentially around polished rod 20 such that the split juncture 80 of each ring is alternated. The split of the supple rings is aligned on one side of the polished rod, and the split of the rigid rings is aligned on the opposite side of the polished rod. In this way, the most effective seal is maintained. A more complete description of this arrangement is seen in conjunction with the description of FIGS. 5-7.

At the lower portion of FIG. 3, the threaded engagement of the unitized housing body is apparent. The V-type thread 74 engages the unitized housing body into the upper surface of pumping T-valve. Cap 46 is threaded upon square threads 82, which may be seen on either side of the unitized housing at the upper half of FIG. 3.

Square threads are used in the preferred embodiment for connection between the cap and the unitized housing body because square threads provide a stronger pressurized seal of the sealing apparatus, up to 7,500 psi, or even greater. Square threads are stronger than V-type threads, and the square threads shown in FIG. 3 provide greater pressure resistance in the event of a pressure surge in the well.

Lower edge 84 of the unitized housing body is seen at the bottom of FIG. 3. Lower recess 86 is seen as a tapered portion of the unitized housing body.

In FIG. 4, fluid responsive gland 90 is shown in detailed cross-section. Lower self-alignment bushing 72 is seen supporting lower flat packing ring 50. As indicated by the shading of the lower flat packing ring, it preferably is comprised of a relatively rigid material, although such a material is not required. Above the lower flat packing ring is one of the rectangular channels 94. These channels are rectangular void spaces encircling the polished rod. They provide space between the supple rings and the rigid rings. The rectangular channel provides room for compression of the packing rings upon each other, resulting in a tighter fit of the seals against the polished rod and the housing. At the upper portion of FIG. 4, the remainder of the stack is seen comprising in part fourth supple ring 64, fourth rigid ring 66, and rectangular channel 92. Next is fifth supple ring 68 and upper flat packing ring 70. Some packing rings are not shown in FIG. 4. For most applications, upper flat packing ring 70 will be comprised of the same material as lower flat packing ring 50. Materials will be discussed in greater detail in the paragraphs following the description of the figures. Resting on the upper surface of upper flat packing ring 70 is upper self-alignment bushing 48.

FIG. 5 shows a top view of fifth supple ring 68. This ring includes outer face 96 and inner face 98. Facet edge 106 forms a peak, and it is the boundary between inner and outer faces. Split juncture 100 is a separation of the ring. The split is about a 45° angle separation through the entirety of the ring. Split juncture 100 facilitates placement of the ring upon a polished rod by only a relatively slight deformation of the ring, and without disengaging the polished rod from the well. The ring resumes its structural shape after deformation, and it completely encircles the polished rod. Aperture 102 is the space through the center of the ring.

FIG. 6 shows a side view of ring 68 shown in FIG. 5. Sidewall 104 forms a slidable sealing connection with the inner surface of the unitized housing to effect a fluid seal. Outer face 96 is separated from the sidewall by facet edge 106. Split juncture 100 is shown as a separation proceeding from the upper to the lower margin of the packing ring.

FIG. 7 shows a top view of the fourth rigid ring 66. Split juncture 108 separates the ring at its perimeter, and aperture 116 appears in the center of the ring. Outer face 112 and inner face 114 are bounded by flat mesa 110 which is a flat surface facilitating the formation of rectangular channels when the rings are in a stacked configuration.

Figure 8:
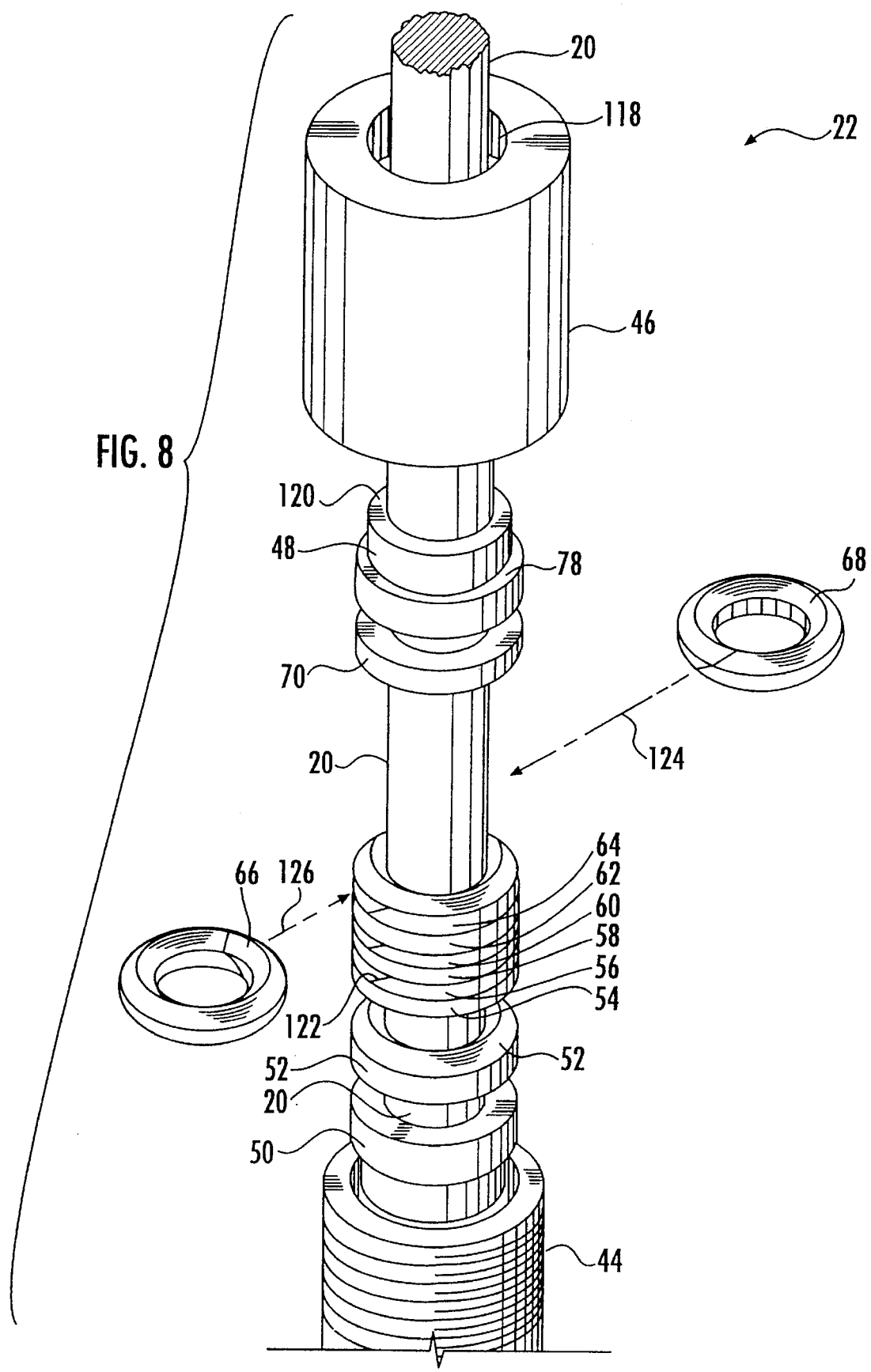
FIG. 8 is an exploded perspective view of the sealing apparatus showing the removal and replacement of packing rings while the apparatus is mounted upon a polished rod.

FIG. 8 is an expanded view of sealing apparatus 22. During maintenance of the sealing apparatus, when packing rings must be replaced, cap 46 may be unscrewed and raised along the length of the polished rod 20 to a height sufficient to facilitate removal and replacement of worn rings. On the cap, inner metal surface 118 forms a mating surface upon which the upper self-alignment bushing 48 aligns the sealing apparatus. This bushing is partly responsible for self-alignment of the invention. Upper margin 120 of the upper self-alignment bushing is shown. Upper offset mating surface 78 rests against the cap during operation of the sealing apparatus. Upper flat packing ring 70 rests upon the upper surface of fifth supple ring 68.

During maintenance, each of the bushings and packing rings may be pulled from the unitized housing body 44 using an instrument such as, for example, an ice pick or other sharp utensil. The fifth supple ring easily may be removed by separating the split portion of the ring and taking it off the polished rod 20. Ring 68 may be replaced along application direction 124. Likewise, fourth rigid ring 66 may be removed and then replaced along application direction 126.

The split of each ring is alternated such that the split junctures of rigid rings are aligned on one side of the polished rod, while split junctures of supple rings are aligned on the opposite side of the polished rod. This arrangement is the preferred embodiment for maintaining an effective seal against fluid escape along the length of the polished rod. Rings 64, 62, 60, 58, 56, 54 and 52, likewise, are removed and replaced with new rings during maintenance. This procedure may be performed within about five minutes for most applications. All packing within the sealing apparatus may be replaced without removing the sealing apparatus from the polished rod.

MATERIALS

The unitized housing body preferably is comprised of a one-piece steel housing. The housing is machined from a circular piece of raw stock steel to the specifications needed for each application. The preferred steel is 4130 tinsel strain steel. In some applications, a mild carbon steel may be desirable as providing a more highly corrosive resistant steel for well bores that include higher than normal $H_2S$ or $CO_2$ gas concentrations. Mild carbon steel is softer than 4130 steel. A milder steel typically exhibits better corrosive resistance, but less desirable pressure ratings. In some cases of higher concentration of $H_2S$ or $CO_2$ gas, stainless steel may be a desirable material.

Cast iron materials are not as desirable as steel because cast iron materials do not exhibit the striking force characteristics nor the fluid pressure characteristics of steel. For most applications, steel is far superior to cast iron. In some cases, a stress fracture in cast iron that is invisible to the human eye may undergo a catastrophic failure which can injure personnel or equipment near a well. Such steel may be obtained from Ryerson Metals, 1211 Kress Street, Houston, Tex. 77020.

Materials used for the bushings and packing rings in this invention may be selected from a wide variety of materials. For most applications, packing rings must be sufficiently resilient to withstand operating temperatures as high as 230° F. and high levels of $H_2S$ and $CO_2$ concentrations. Saltwater frequently is used in well operations, and packing rings must be resistant to salt water. Different wells provide different corrosive materials, and the particular arrangement and composition of rings that will achieve optimum performance varies.

In most applications, the preferred material for supple rings is a nitrile (buna-N) rubber. This material typically withstands operation in a temperature range between about −22° F. and 212° F. or more. It is supple and malleable, allowing for a good seal between the ring, the polished rod, and the inner surface of the housing. Such rings are copolymers of acrylonitrile and butadiene. It is necessary that the particular nitrile chosen for supple rings meets the temperature requirements of the oil well application. The nitrile (buna-N) supple rings may be obtained from Seal Jet of Houston, a manufacturer of seals located at 4540 W. 34th Street, Houston, Tex. 77092. Such nitrile seals are sold under the trade name ECO RUBBER 1 (NBR).

For most applications, the preferred material for rigid rings is a nickel-filled polytetrafluorethylene (teflon) sold by Seal Jet of Houston under the trade name ECOFLON 2 (TFN). This material has superior temperature characteristics, being capable of withstanding operating temperatures between −380° F. and 500° F. It is comprised of 10% nickel, 15% glass, and 2% moly-filed polytetrafluorethylene.

Other materials may be used for packing rings in different applications, including polyurethane materials, which are particularly good for hot water applications and also are resistant to saltwater. Polyurethane materials are not preferred for high temperature applications.

Fluorocarbon rubber may be used in applications showing a high $CO_2$ and $H_2S$ content, but they are not considered suitable for well bores that include substantial amounts of saltwater.

The lower and upper self-alignment bushings and flat packing rings preferably are comprised of black rigid plastic (POM), polyoxymethylene, which is commonly referred to as DELRIN® (DELRIN is believed to be a registered trademark of BASF Windott Company. Such bushings and rings may be obtained from Seal Jet of Houston. They are sold under the trade name ECOTAL (POM). Such material is a thermoplast with good mechanical properties, low water absorption and good chemical resistance. It is the preferred material for wear bushings and flat packing rings.

V-rings made of materials not described above may be used, and the above description is in no way exhaustive of the different types of materials that may be used in this invention.

INSTALLATION AND MAINTENANCE

Initial installation of the sealing apparatus of this invention is performed by removing the polished rod and sliding the unitized structure, with packing rings in place, onto the polished rod. The polished rod is then reattached to the well, and the sealing apparatus is ready for threaded connection into the pumping T-valve 24 as shown in FIGS. 1 and 2. In general, installation may be done quickly, and the sealing apparatus usually requires no wrenches or similar tools for installation. The cap is hand tightened prior to insertion of the polished rod through the sealing apparatus. The invention is self-aligning.

After a certain period of time, depending upon the corrosion, temperature, and abrasive characteristics of the well, and depending upon the particular packing material used, the packing rings may need replacement. In that case, replacement may occur as described previously in connection with the description of FIG. 8, whereby the entire fluid responsive gland 90 may be replaced, if necessary, without removing the apparatus from the polished rod.

The number, arrangement and type of packing rings used in this invention will be dictated by cost and by the characteristics of the particular well. This invention is not limited to any particular number of packing rings or any particular arrangement of packing rings. For example, packing rings of only one type could be used. It is not required that both supple and rigid packing rings be used, although it is preferred. An alternating arrangement is not required, although it is preferred.

Other embodiments are within the scope of the following claims.

What is claimed is:

1. A sealing apparatus for a reciprocating polished rod, comprising:

a unitary housing body having a lower end and an upper end, the lower end being adapted for engagement into a well and the upper end comprising a first mating surface comprising a lip formed on an inner surface thereof;

a cap having an aperture for receiving the polished rod, the cap being removably engaged with the upper end of the unitized housing body and comprising a second mating surface formed on an inner surface thereof; and a fluid responsive gland held in a compressed state by said first mating surface and said second mating surface for circumferentially engaging the polished rod and effecting a sliding seal upon the rod, said fluid responsive seal comprising:

a first self-alignment bushing having an L-shaped cross-section, said first self-alignment bushing communicating with said first mating surface to axially compress the fluid responsive gland and communicating with the inner surface of the upper end of the housing body to radially align the polished rod, a second self-alignment bushing having an L-shaped cross-section, said second self-alignment bushing communicating with said second mating surface of said cap to axially compress the fluid responsive gland and communicating with both an inner edge of the aperture of said cap and the inner surface of the upper end of the housing body to radially align the polished rod, and a plurality of V-shaped packing rings stacked in one continuous and uninterrupted zone between said first self-alignment bushing and said second self-alignment bushing.

2. The apparatus of claim 1, wherein said V-shaped packing rings are formed alternately from a supple material and a rigid material.

3. The apparatus of claim 1, wherein each of said V-shaped packing rings defines an annular channel.

4. The apparatus of claim 2, wherein each of said V-shaped packing rings defines an annular channel.

5. The apparatus of claim 4, wherein each V-shaped ring formed from said rigid material defines a flat annular surface which cooperates with the annular channel of an adjacent V-shaped ring.

6. The apparatus of claim 2, wherein said supple material is an elastomeric polymer and said rigid material is a polytetrafluorethylene-containing material.

7. The apparatus of claim 1, wherein each of said V-shaped packing rings comprises a break therein allowing removal thereof from around the polished rod.

8. The apparatus of claim 1, wherein the outer surface of the upper end of the unitized housing body and the inner surface of the cap comprise square shoulder type threads.

9. The apparatus of claim 1, further comprising a cathedral-shaped ring washer disposed between said first self-alignment bushing and said V-shaped packing rings.

10. The apparatus of claim 1, further comprising a C-shaped ring washer disposed between said second self-alignment bushing and said V-shaped packing rings.

11. The apparatus of claim 9, further comprising a C-shaped ring washer disposed between said second self-alignment bushing and said V-shaped packing rings.

12. A method of effecting a fluid seal around a reciprocating polished rod, comprising the steps of:

providing a unitary housing body having a lower end and an upper end, the lower end being adapted for engagement into a well and the upper end comprising a first mating surface comprising a lip formed on an inner surface thereof;

removably engaging a cap with the upper end of the unitized housing body, the cap having an aperture for receiving the polished rod and comprising a second mating surface formed on an inner surface thereof; and forming a fluid responsive gland by providing a first self-alignment bushing having an L-shaped cross-section, said first self-alignment bushing communicating with said first mating surface to axially compress the fluid responsive gland and communicating with the inner surface of the upper end of the housing body to radially align the polished rod, a second self-alignment bushing having an L-shaded cross-section, said second self-alignment bushing communicating with said second mating surface of said cap to axially compress the fluid responsive gland and communicating with both an inner edge of the aperture of said cap and the inner surface of the upper end of the housing body to radially align the polished rod, and a plurality of V-shaped packing rings stacked in one continuous and uninterrupted zone between said first self-alignment bushing and said second self-alignment bushing; and compressing the fluid responsive gland between said first mating surface and said second mating surface so as to circumferentially engage the polished rod and effect a sliding seal upon the rod.

13. The method of claim 12, further comprising replacing the sliding seal by the steps of:

removing the cap from the housing body by unscrewing and sliding the cap along the length of the polished rod;

sliding the fluid responsive gland along the length of the polished rod;

disengaging worn portions of the fluid responsive gland from the polished rod by separating the portions at a break therein;

replacing worn portions of the fluid responsive gland with new portions;

sliding the reconditioned fluid responsive gland into the housing body;

sliding the cap upon the housing body; and screwing the cap onto the housing body.

14. A method of maintaining a unitary sealing apparatus for a reciprocating polished rod, comprising:

disassembling the unitary sealing apparatus by unscrewing a threaded connection between a cap and a unitary housing body;

displacing the cap and a top bushing having an L-shaped cross-section along the polished rod, thereby exposing a continuous and uninterrupted stack of worn packing rings;

replacing the worn packing rings with new packing rings by separating each worn packing ring at a break therein, stacking the new packing rings in one continuous and uninterrupted zone, arranging breaks in the new packing rings at staggered locations, and moving the new packing rings into engagement with an L-shaped bottom bushing;

returning the top bushing to a position adjacent to the new packing rings; and reassembling the unitized sealing apparatus by screwing together the threaded connection and engaging a portion of the L-shaped top bushing with an aperture in the cap to compress the new packing rings between the top and bottom bushings and effect a sliding seal upon the rod, wherein the rod is raidally aligned within said sliding seal by said top and bottom bushings.

* * * * *